United States Patent
Arakawa et al.

(10) Patent No.: US 6,203,125 B1
(45) Date of Patent: Mar. 20, 2001

(54) TRACK BELT FOR SNOWMOBILE

(75) Inventors: Jun Arakawa; Jun Shimada, both of Hiratsuka (JP)

(73) Assignee: Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/160,184

(22) Filed: Sep. 25, 1998

(30) Foreign Application Priority Data

| Oct. 3, 1997 | (JP) | ................................................... | 9-271251 |
| Oct. 24, 1997 | (JP) | ................................................... | 9-291961 |
| Oct. 24, 1997 | (JP) | ................................................... | 9-291963 |
| Oct. 24, 1997 | (JP) | ................................................... | 9-291967 |

(51) Int. Cl.$^7$ ................................................... B62D 55/24
(52) U.S. Cl. .......................... 305/166; 305/170; 305/179
(58) Field of Search ................................... 305/165, 166, 305/167, 170, 171, 177, 178, 179, 181

(56) References Cited

U.S. PATENT DOCUMENTS

| 2,899,242 | * | 8/1959 | Bombardier | ...................... | 305/167 X |
| 3,477,767 | * | 11/1969 | McNeil | ................................. | 305/167 |
| 3,480,339 | * | 11/1969 | Kell | ...................................... | 305/166 |
| 3,582,154 | * | 6/1971 | Russ, Sr. | ............................... | 305/166 |
| 3,704,918 | * | 12/1972 | Perreault | ........................... | 305/179 X |
| 3,754,798 | * | 8/1973 | Chaumont | .............................. | 305/166 |

\* cited by examiner

Primary Examiner—Russell D. Stormer
(74) Attorney, Agent, or Firm—Arent Fox Kintner Plotkin & Kahn, PLLC

(57) ABSTRACT

Disclosed is a track belt for a snowmobile, which comprises a track belt main body, a core body arranged along a longitudinal direction of the track belt main body, reinforcing woven cloths disposed respectively in the outside and inside of the core body, cover layers for covering these reinforcing woven cloths and a plurality of horizontal rigid members placed at specified intervals in the longitudinal direction of the track belt main body and in the cross direction of the same. Overlapping of the reinforcing woven cloth is disposed respectively in the outside and inside of the horizontal rigid members. Reinforcing woven cloth is made by spirally winding a belt-like woven cloth having a specified width on a circumference of the track belt main body at a specified angle to the longitudinal direction of the track belt main body. Reinforcing woven cloths are made of tire fabric cords. A cord orientation angle of each of the tire fabric cords is set to a specified bias angle to the longitudinal direction of the track belt main body. End of the reinforcing woven cloths are butt-joined at both ends so as to have substantially an endless structure. A horizontal rigid member is disposed between the core body and the inner reinforcing woven cloth. Alternatively, the inner reinforcing woven cloth of the core body is folded on the core body or the outer reinforcing woven cloth in the longitudinal direction of the track belt main body on the circumference of the same.

2 Claims, 10 Drawing Sheets

TRACK BELT FOR SNOWMOBILE

BACKGROUND OF THE INVENTION

The present invention relates to a track belt for a snowmobile. More particularly, the invention relates to a track belt for a snowmobile, which provides improved high-speed running performance for the snowmobile.

Conventionally, for example as shown in FIG. 10, a snowmobile that runs on snow comprises one or two steering skis 2 provided in the front lower part of a car body 1 and an endless track belt main body (caterpillar) 31 in its rear side.

An output from an engine 4 is transmitted to the track belt main body 31 via an automatic transmission 5 and a wheel sprocket 6. Then, the engine output is transmitted to a snow surface by the track belt main body 31. Reference numerals 7 and 8 respectively denote a suspension rail for the track belt main body 31 and a steering handle.

The track belt main body 31 is constructed, for example as shown in FIG. 11, in a manner that reinforcing woven cloths 3a and 3b are respectively disposed in the outside and inside of a core body 9 composed of an organic fiber cord such as a polyester cord, the core body being disposed along a longitudinal direction of the track belt main body 31, the reinforcing woven cloths 3a and 3b are covered respectively with outer and inner cover layers 11a and 11b which are made of elastic rubber materials or the like and, further, in order to increase surface rigidity of a snow contact surface by reinforcing the track belt main body 31, between the core body 9 and the outer reinforcing woven cloth 3a, a plurality of horizontal rigid members 12 (rods) are buried at specified intervals in the longitudinal direction of the track belt main body 31 and in a cross direction of the same.

In the outside of the outer cover layer 11a, a plurality of traction projections 13 are provided at specified intervals in the longitudinal direction of the track main body 3 and in the cross direction of the same. In the inside of the inner cover layer 11b, a driving projection 14 engaged with a pin of the wheel sprocket 6 is integrally provided at a specified interval with respect to the longitudinal direction of the track belt main body 3.

Concerning the reinforcing woven cloths 10a and 3b provided in the outside and inside of the foregoing conventional track belt main body 31, joined parts thereof on the circumference of the track belt main body 3 are formed to have specified overlapping (overlapping between ends and the other ends of the respective reinforcing woven cloths in the longitudinal direction) in places where the horizontal rigid member 12, the traction projections 13 and the driving projection 14 are not positioned. During operation of the track belt, bending occurs repeatedly in the joined parts. However, because of the improvement in snowmobile track belt performance in recent years, bending fatigue in the joined parts has increased, and such bending fatigue causes failures such as peeling or fracture in the joined parts. Consequently, there was a limit to the improvement in high-speed running performance.

In addition, the existence of the joined parts causes rigidity to be non-uniform on the circumference of the track belt main body 31. Because of such non-uniform rigidity, vibrations are generated in the track belt main body 31, or peeling, fracture or other failures have occurred in the joined parts during high-speed running. Thus, there was a limit to the improvement in high-speed running performance.

The reinforcing woven cloth 3a provided in the outside of the track belt main body 3 functions to protect the core body 9 from external damage and hold the horizontal rigid member. Because of the improvement in snowmobile performance in recent years, however, the reinforcing woven cloth 3a does not appropriately perform the function of holding (protecting) the horizontal rigid member and, during high-speed running, failures such as fracture in the outer reinforcing woven cloth 3a or breaking of the horizontal rigid member 12 have occurred. In order to deal with these problems, strength of the reinforcing woven cloth 3a may be increased by increasing its thickness. But such an increase in strength may cause increases in the weight of the track belt main body 31 and rolling resistance. Thus, for the conventional structure, there was a limit to the improvement in snowmobile high-speed running performance.

SUMMARY OF THE INVENTION

An object of the present invention is to provide a track belt for a snowmobile, which can improve snowmobile high-speed running performance by preventing such failures as peeling or fracture in overlapping end joined parts of reinforcing woven cloths disposed respectively in the outside and inside of a core body.

Another object of the invention is to provide a track belt for a snowmobile, which can improve snowmobile high-speed running performance by eliminating a problem of non-uniform rigidity on the circumference of a track belt main body caused by overlapping end joined parts of reinforcing woven cloths disposed respectively in the outside and inside of a core body and preventing the occurrences of vibration in the track belt main body and peeling or fracture in the joined parts during high-speed running.

Still another object of the invention is to provide a track belt for a snowmobile, which can improve snowmobile high-speed running performance by increasing a horizontal rigid member holding function without causing any substantial increases in the weight of a track belt main body and rolling resistance.

(1) According to an aspect of the prevent invention, a snowmobile track belt comprises a track belt main body, a core body arranged along a longitudinal direction of the track belt main body, reinforcing woven cloths disposed respectively in the outside and inside of the core body, cover layers for covering these reinforcing woven cloths and a plurality of horizontal rigid members placed at specified intervals in the longitudinal direction of the track belt main body and buried in a cross direction of the track belt main body. In this case, overlapping end joined parts of the reinforcing woven cloths are arranged respectively in the outside and inside of the horizontal rigid members.

Since the overlapping end joined parts are arranged respectively in the outside and inside of the horizontal rigid members, repeated bending does not occur in the horizontal rigid members during track belt operation, which in turn prevents bending fatigue in the overlapping end joined parts. Therefore, snowmobile high-speed running performance can be improved without producing any peeling or fracture in the overlapping end joined parts.

(2) According to another aspect of the present invention, a snowmobile track belt comprises a track belt main body, a core body arranged along a longitudinal direction of the track belt main body, reinforcing woven cloths disposed respectively in the outside and inside of the core body, cover layers for covering these reinforcing woven cloths and a plurality of horizontal rigid members placed at specified intervals in the longitudinal direction of the track belt main body and buried in a cross direction of the track belt main body. In this case, each of the reinforcing woven cloths is made by spirally winding a belt-like woven cloth having a specified width on a circumference of the track belt main body at a specified angle to the longitudinal direction of the track belt main body.

Since each of the reinforcing woven cloths is made by spirally winding the belt-like woven cloth on the circumference of the track belt main body, there are only open ends in two places, i.e., where the winding of the belt-like woven cloth starts and ends, and hence no overlapping end joints parts exist in the reinforcing woven cloth. Thus, it is possible to solve a problem of non-uniform rigidity on the circumference of the track belt main body caused by overlapping end joined parts in the reinforcing woven cloths, which occurred in the conventional case.

(3) According to the present invention, a snowmobile track belt comprises a track belt main body, a core body arranged along a longitudinal direction of the track belt main body, reinforcing layers disposed respectively in the outside and inside of the core body, cover layer for covering these reinforcing layers and a plurality of horizontal rigid members placed at specified intervals in the longitudinal direction of the track belt main body and buried in a cross direction of the track belt main body. In this case, the reinforcing layers are made of tire fabric cords, an orientation angle of each of the tire fabric cords is set to a specified bias angle against the longitudinal direction of the track belt main body and end joined parts of the reinforcing layers are formed by butt-joining of both ends.

Since the reinforcing layers are made of tire fabric cords and the end joined parts of the reinforcing layers are formed by butt-joining of both ends, no overlapping end joined parts exist. Thus, it is possible to solve the problem of non-uniform rigidity on the circumference of the track belt main body caused by overlapping end joined parts in the reinforcing layers, which occurred in the conventional case.

Herein, the tire fabric cord is a member made by constructing a cord such as polyester cord, nylon cord, and aromatic polyamide cord in a form like a reed screen. This tire fabric cord is usually used for forming a tire belt layer or a carcass layer.

(4) According to still another aspect of the present invention, a snowmobile track belt comprises a track belt main body, a core body arranged along a longitudinal direction of the track belt main body, reinforcing layers disposed respectively in the outside and inside of the core body, cover layers for covering these reinforcing layers and a plurality of horizontal rigid members placed at specified intervals in the longitudinal direction of the track belt main body and buried in a cross direction of the track belt main body. In this case, a horizontal rigid member is arranged between the core body and the inner reinforcing layer.

Since the horizontal rigid member is arranged between the core body and the inner reinforcing layer, functions for holding the horizontal rigid member from the outside can be provided to both of the outer reinforcing layer and the core body. Accordingly, the horizontal rigid member can be sufficiently protected from the outside. Therefore, it is possible to perform the function of holding a horizontal rigid member without causing any substantial increases in the weight of the track belt main body and rolling resistance.

(5) According to the present invention, a snowmobile track belt comprises a track belt main body, a core body arranged along a longitudinal direction of the track belt main body, reinforcing woven cloths disposed respectively in the outside and inside of the core body, cover layers for covering these reinforcing woven cloths and a plurality of horizontal rigid members placed at specified intervals in the longitudinal direction of the track belt main body and buried in a cross direction of the track belt main body. In this case, the reinforcing woven cloth in the inside of the core body is folded on the core body or a reinforcing woven cloth in the outside in the longitudinal direction of the track belt main body on the circumference of the same, and the folded part is arranged in the outside of the horizontal rigid member and in the vicinity of a side of the horizontal rigid member.

Since the folded part is arranged in the outside of the horizontal rigid member and in the vicinity of the side of the same, the horizontal rigid member can be held by the folded part. Thus, it is possible to perform the function of holding the horizontal rigid member without causing any substantial increases in the weight of the track belt main body and rolling resistance. According to the present invention, arrangement of the folded part in the vicinity of the side of the horizontal rigid member is included in constitution. This is because a horizontal rigid member holding force is rather weak in the vicinity of the side of the horizontal rigid member.

For a more complete understanding of the present invention and the advantages thereof, reference is now made to the following description taken in conjunction with the accompanying drawings.

Figure 1:
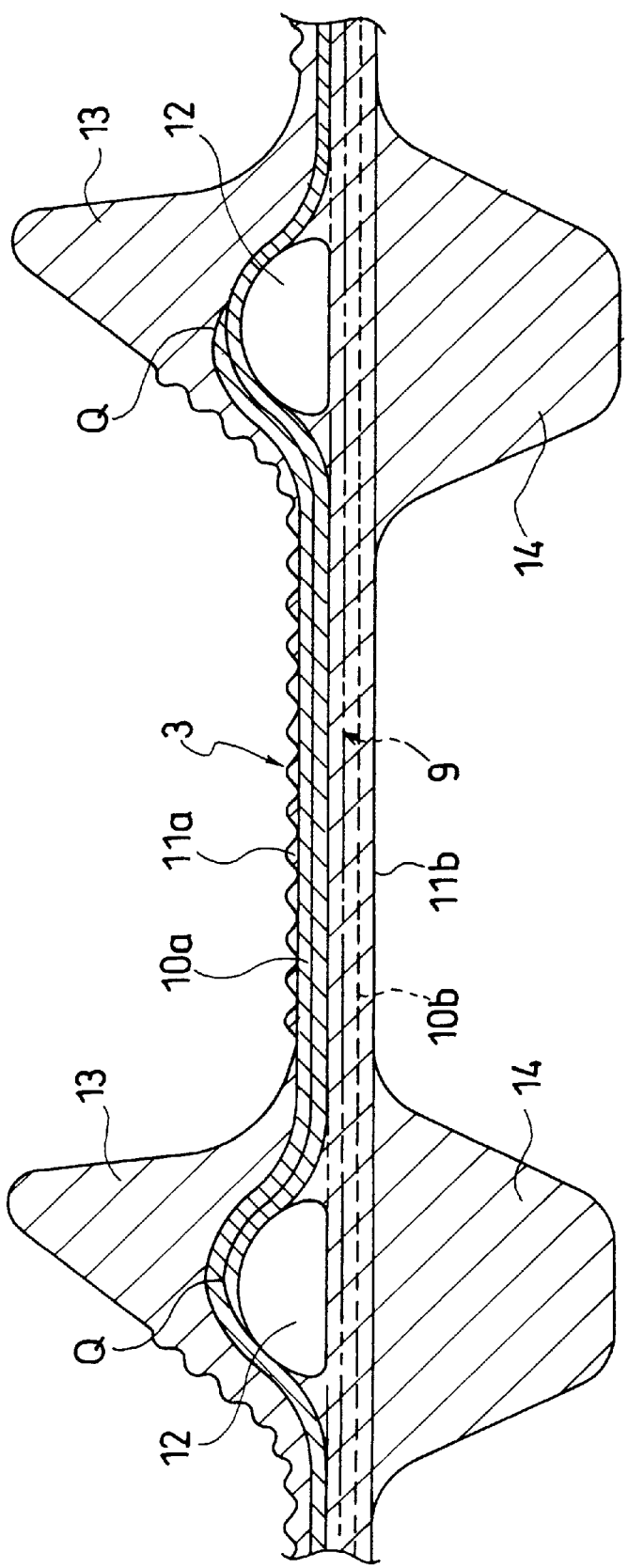
FIG. 1 is a partially expanded sectional view showing an overlapping end joined part of an outer reinforcing woven cloth of a track belt main body of an embodiment of the present invention, the cross section being taken along a line A—A shown in FIG. 11.

DESCRIPTION OF THE PREFERRED EMBODIMENTS (1) In FIG. 1, a reference numeral 9 denotes a core body made of a polyester cord, and 12 denotes horizontal rigid members (rods) arranged in a cross direction of a track belt main body 3. Inner and outer reinforcing woven cloths 10*b* and 10*a* are disposed respectively in the inside of the core body 9 and in the outside of the horizontal rigid member 12. In the outside of the reinforcing woven cloth 10*a*, an outer cover layer 11*a* having a traction projection 13 on its surface is provided to cover the reinforcing woven cloth 10*a*. In the inside of the reinforcing woven cloth 10*b*, an inner cover layer 11*b* having a driving projection 14 on its surface is provided to cover the reinforcing woven cloth 10*b*.

An overlap Q of the outer reinforcing woven cloth 10*a* is disposed to be positioned in the outside (upper part) of the horizontal rigid member 12. This overlap Q is protected by thick traction projection 13 and the driving projection 14. Accordingly, since bending fatigue is reduced in the overlap Q of the outer reinforcing woven cloth 10*a* even if the track belt main body 3 is rotated at a high speed, failures such as peeling or fracture in the overlap Q are prevented and thus high-speed running performance can be improved.

Figure 2:
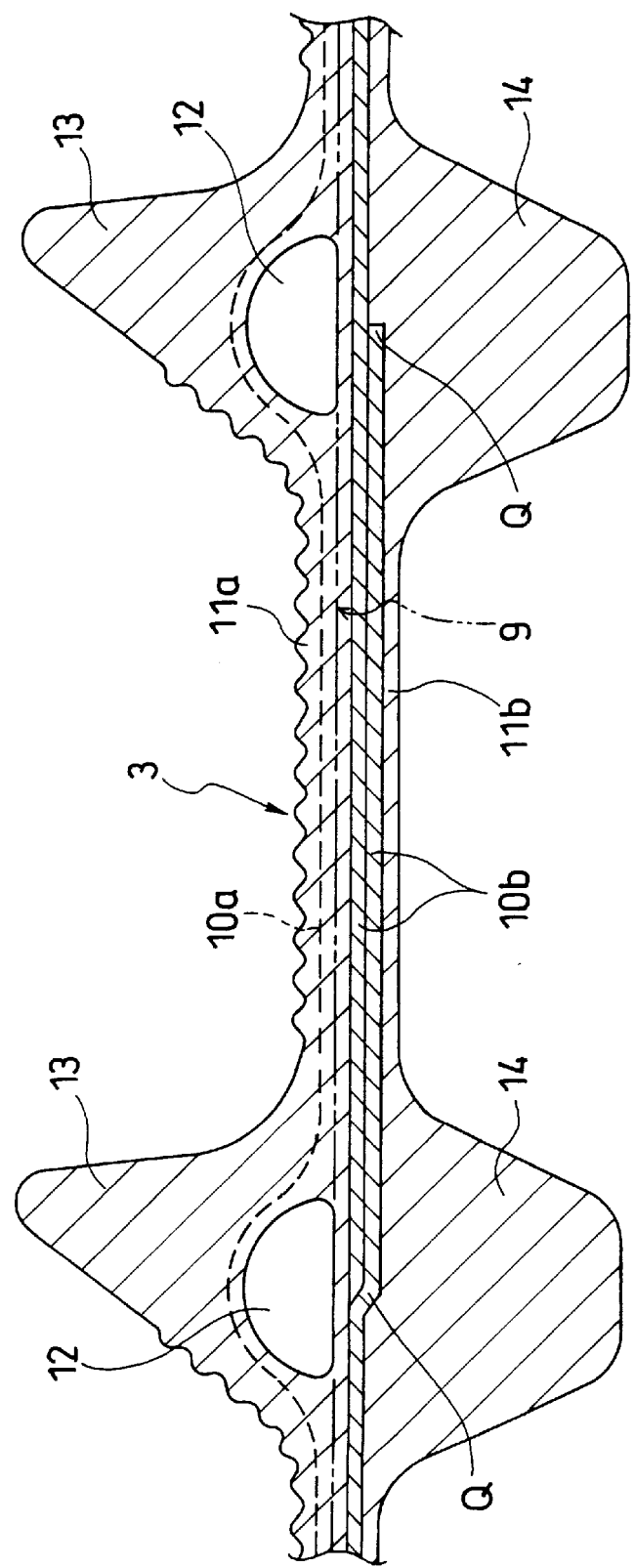
FIG. 2 is a partially expanded sectional view showing an overlapping end joined part of an inner reinforcing woven cloth of a track belt main body of the embodiment of the present invention, the cross section being taken along a line A—A shown in FIG. 11.

Also, as shown in FIG. 2, an overlap Q of the inner reinforcing woven cloth 10*b* may be disposed to be positioned in the inside (lower part) of the horizontal rigid member 12. In addition, the overlap Q of the reinforcing woven cloths 10*a* and 10*b* may be disposed in opposing positions on the circumference of the track belt main body. In this way, an effect of preventing such failures as peeling or fracture in the respective overlap Q may be increased.

Figure 3:
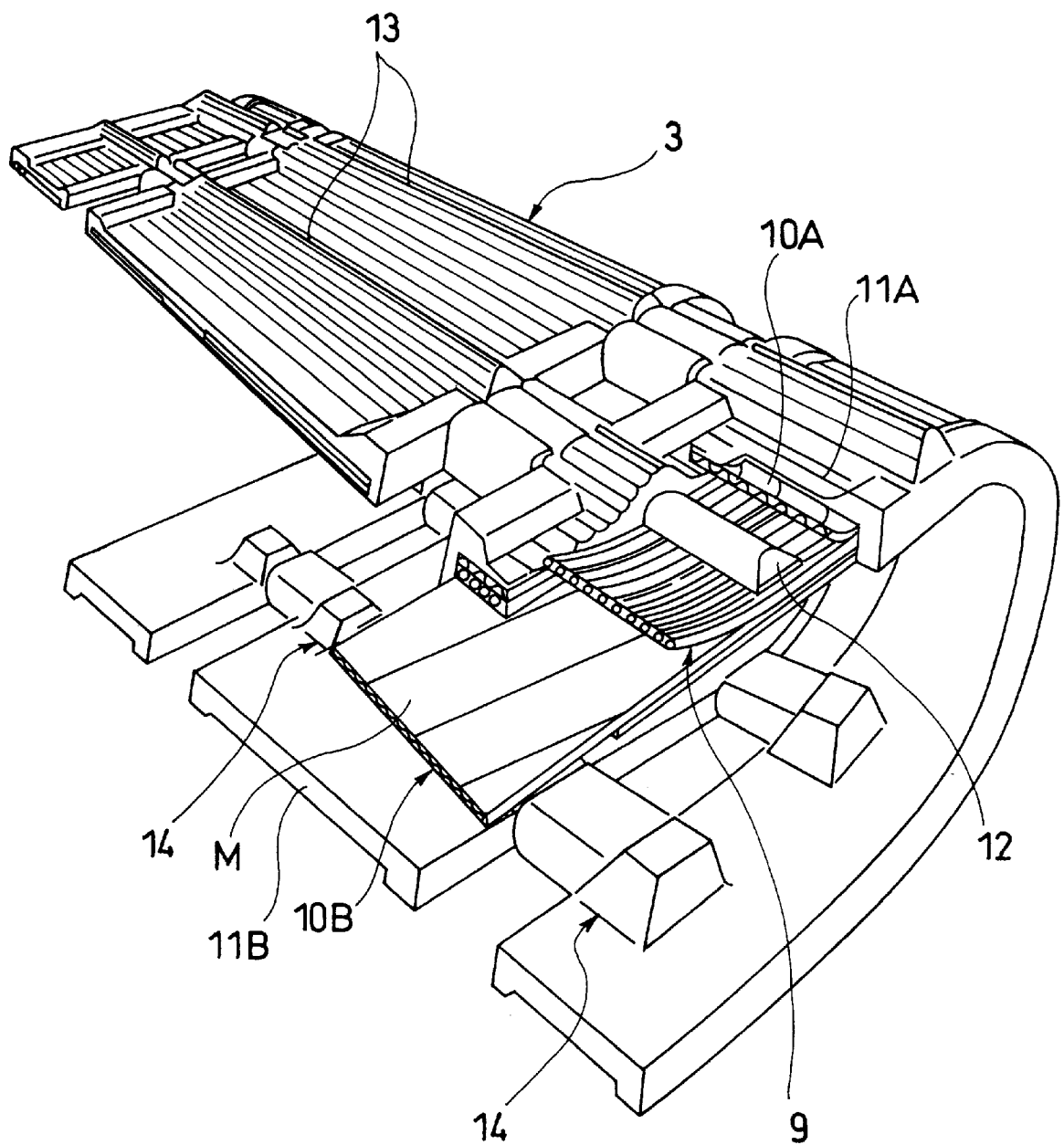
FIG. 3 is a partially cutaway perspective view showing the track belt main body of the embodiment of the present invention.

(2) In FIG. 3, it can be seen that the core body a made of a polyester cord is arranged along a longitudinal direction of a track belt main body 3. The outer reinforcing woven cloth 10A is disposed in the outside of the core body 9, the inner reinforcing woven cloth 10B is disposed in the inside of the core body 9, cover layers 11A, 11B made of elastic rubber materials cover the outside and inside of the reinforcing woven cloths 10A and 10B and the horizontal rigid member (rod) 12 is buried between the core body 9 and the reinforcing woven cloth 10A.

Figure 10:
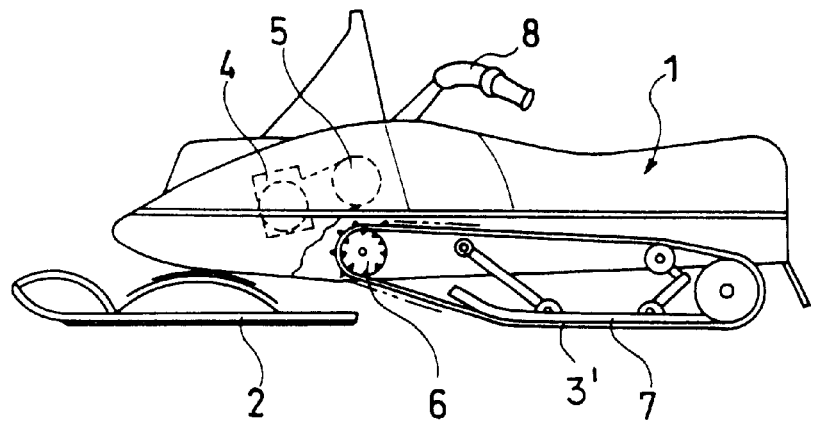
FIG. 10 is a constitutional view showing a conventional snowmobile.

The traction projection 13 is provided on the surface of the outer cover layer 11A. The driving projection 14 is provided on the surface of the inner cover layer 11B so as to be engaged with a pin of a wheel sprocket similar to the prior art showing in FIG 10.

According to the present invention, as shown in FIG. 3, each of the reinforcing woven cloths 10A and 10B is made by spirally winding a belt-like woven cloth M having a specified width on the circumference of the track belt main body 3 at a specified angle to the longitudinal direction of the same.

Figure 4:
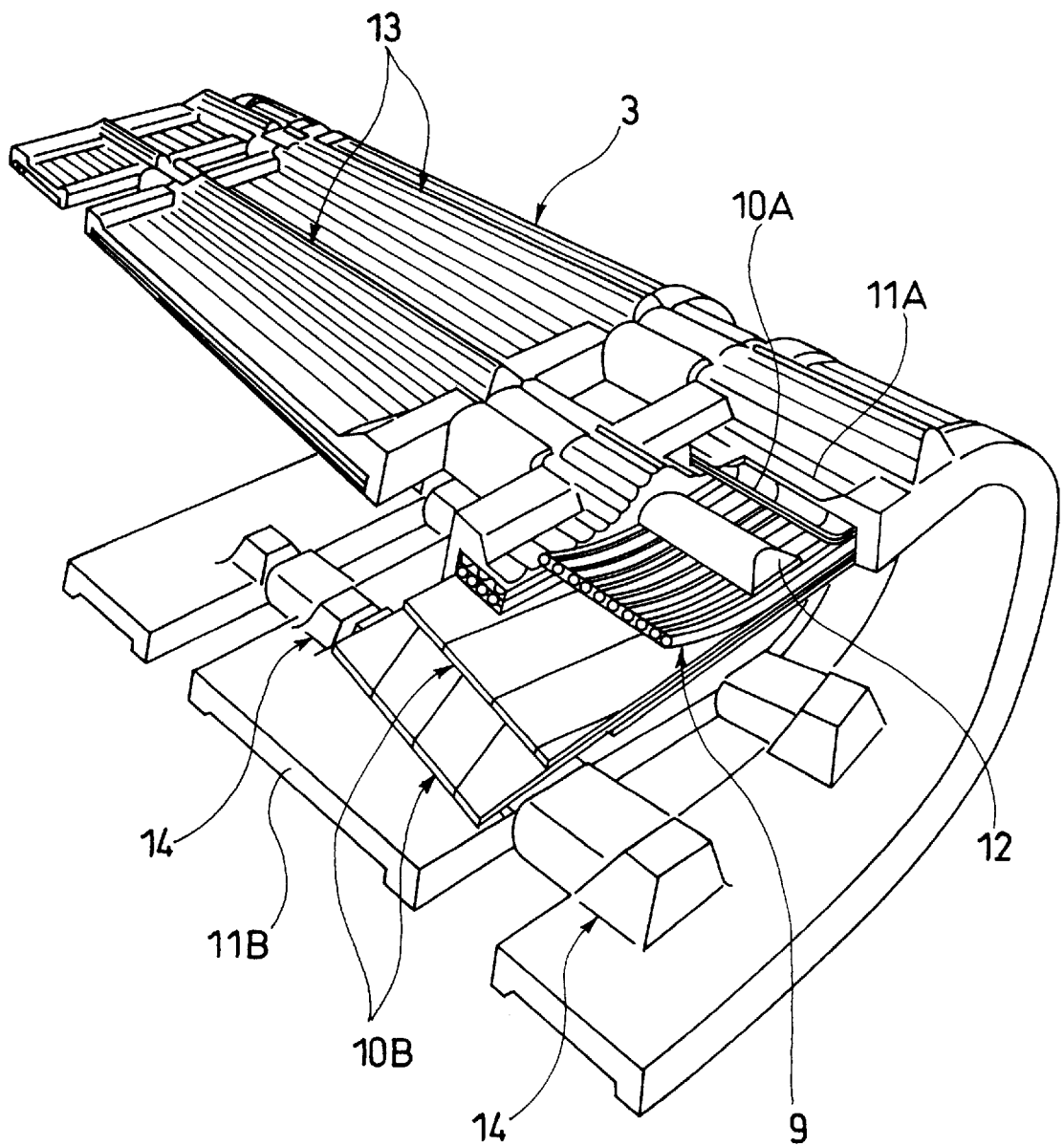
FIG. 4 is another partially cutaway perspective view showing the track belt main body of the embodiment of the present invention.

Directions of spirally winding the belt-like woven cloth M may be reversed between the outer reinforcing woven cloth 10A and the inner reinforcing woven cloth 10B. Moreover, as shown in FIG. 4, plural layers of outer and inner reinforcing woven cloths 10A and 10B may be provided (in FIG. 4, two layers of reinforcing woven cloths 10A and 10B are respectively provided), and directions of spirally winding the belt-like woven cloth M may be reversed between the reinforcing woven cloths adjacent to each other.

Because of the foregoing construction, non-uniform rigidity on the circumference of the track belt main body 3 caused by the joined parts of the outer and inner reinforcing woven cloths 10A and 10B can be prevented and, by preventing vibration, peeling or fracture during high-speed running of the snowmobile, it is possible to improve snowmobile high-speed running performance.

Figure 5:
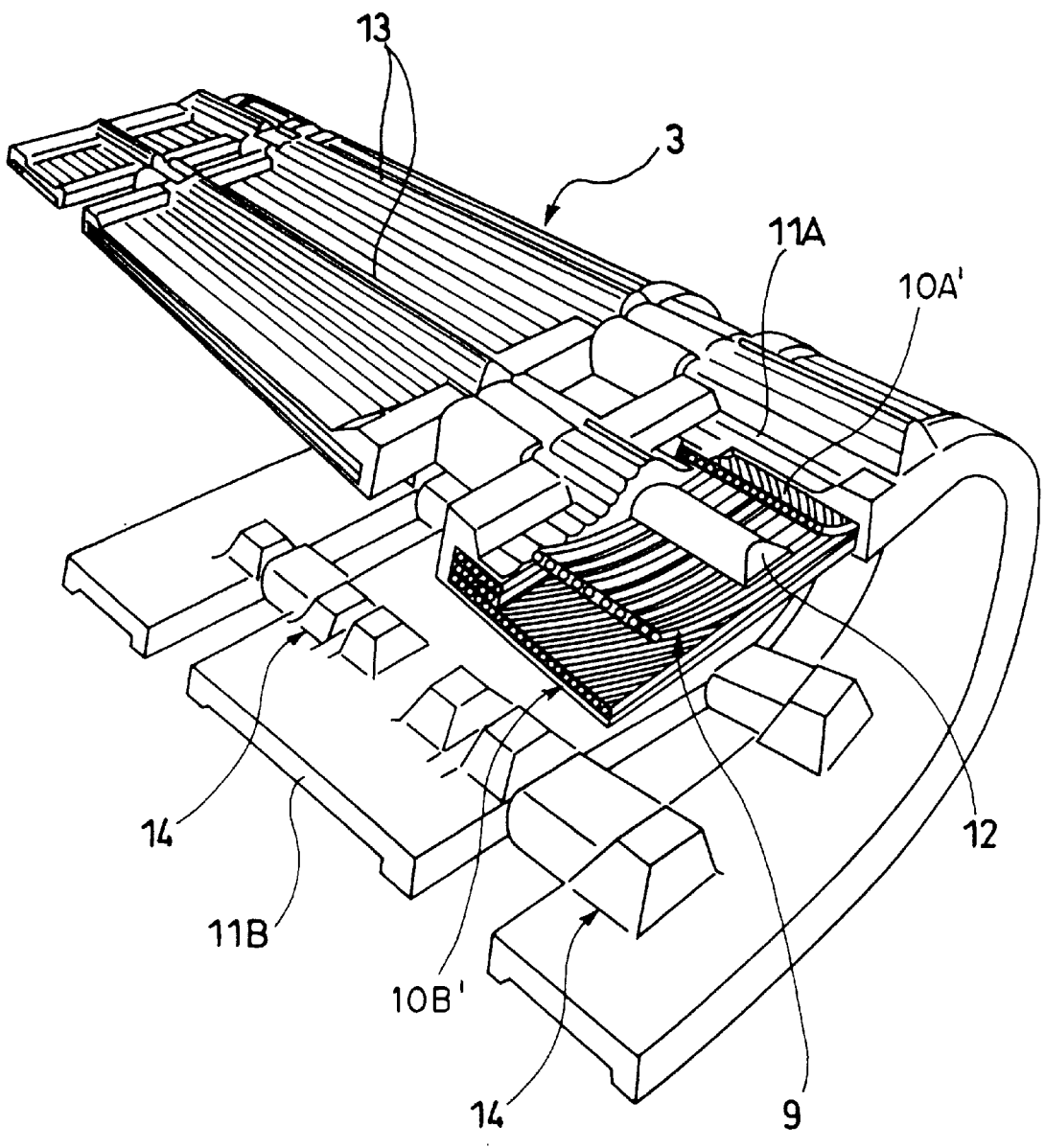
FIG. 5 is still another partially cutaway perspective view showing the track belt main body of the embodiment of the present invention.

Furthermore, according to the present invention, as shown in FIG. 5, the outer and inner reinforcing layers 10A' and 10B' are respectively made of tire fabric cords. Cord orientation angles of these tire fabric cords are set to specified bias angles to the longitudinal direction of the track belt main body 3. End joined parts of the reinforcing layers 10A' and 10B' are formed by butt-joining both ends thereof so as to have substantially an endless structure.

Direction of bias angles for the tire fabric cords should be reversed between the outer and inner reinforcing layers 10A' and 10B'. A bias angle for the tire fabric cord should preferably be set within the range of 5 to 50 degrees.

Figure 6:
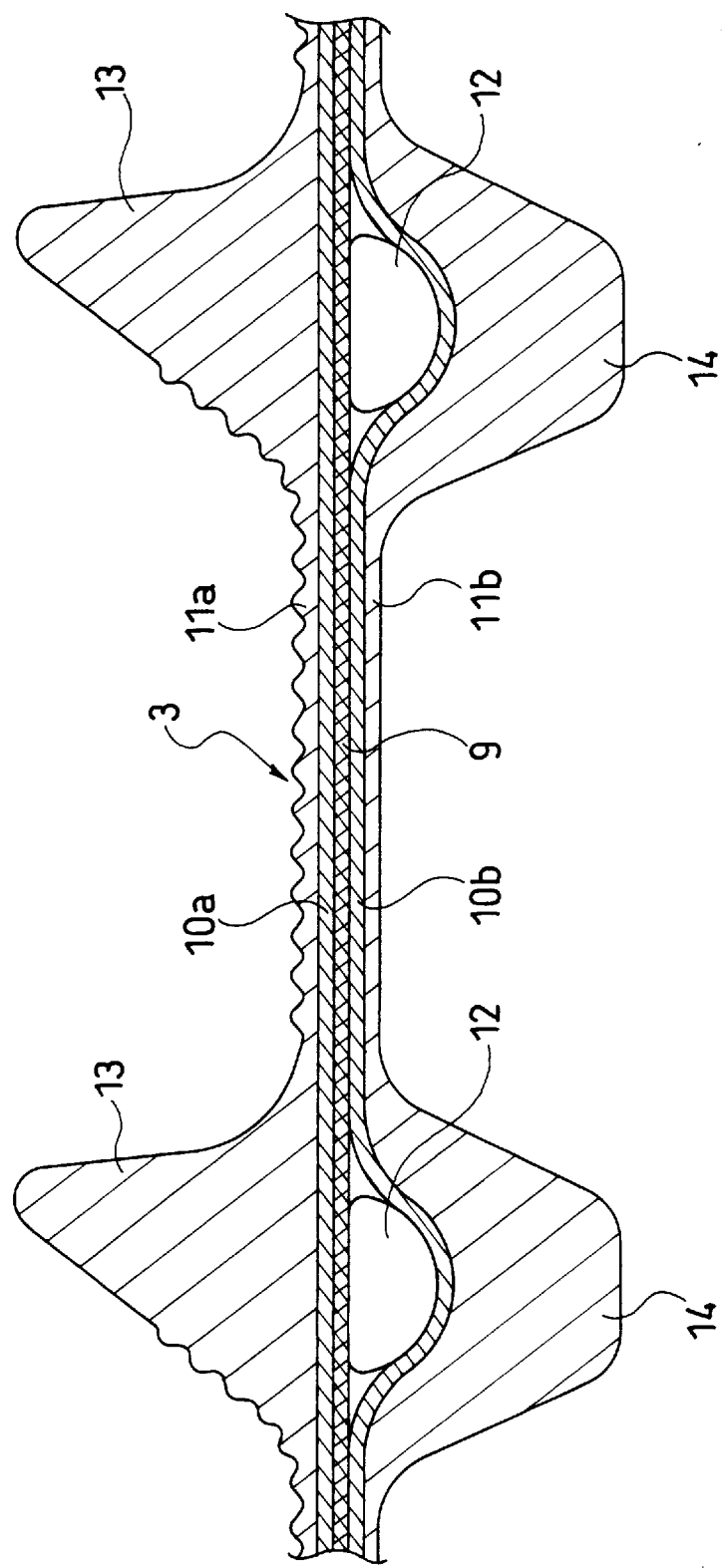
FIG. 6 is a partially expanded sectional view showing the track belt main body of the embodiment of the present invention, the cross section being taken along a line A—A shown in FIG. 11.
Figure 11:
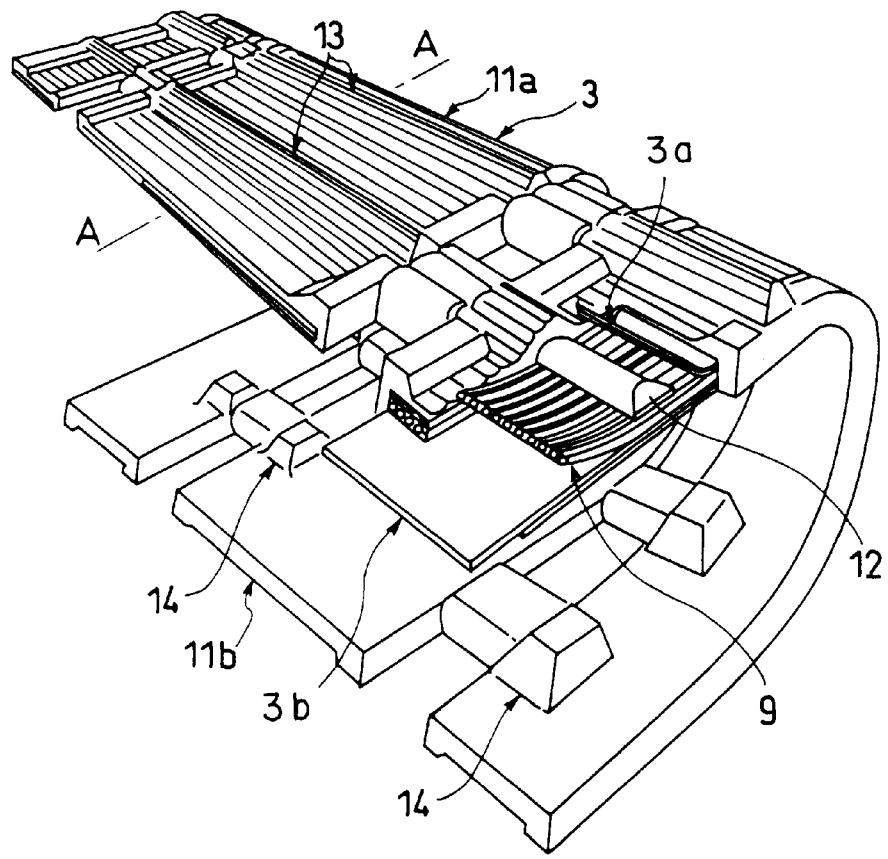
FIG. 11 is a partially cutaway perspective view showing a conventional track belt main body.

(3) FIG. 6 is a partially expanded sectional view showing the track belt main body 3 of an example of the embodiment of the present invention, the cross section being taken along a line A—A shown in FIG. 11. In FIG. 6, the core body 9 is made of a polyester cord and arranged along a longitudinal direction of the track belt main body 3. The reinforcing layer 10*a* is disposed in the outside of the core body 9, the reinforcing layer 10*b* disposed in the inside of the core body 9, and the cover layers 11*a* and 11*b* are respectively disposed in the outside and inside of the reinforcing layers 10*a* and 10*b*. The traction projection 13 is provided on the surface of the outer cover layer 11*a*, and the driving projection 14 is provided on the surface of the inner cover layer 11*b*.

Figure 7:
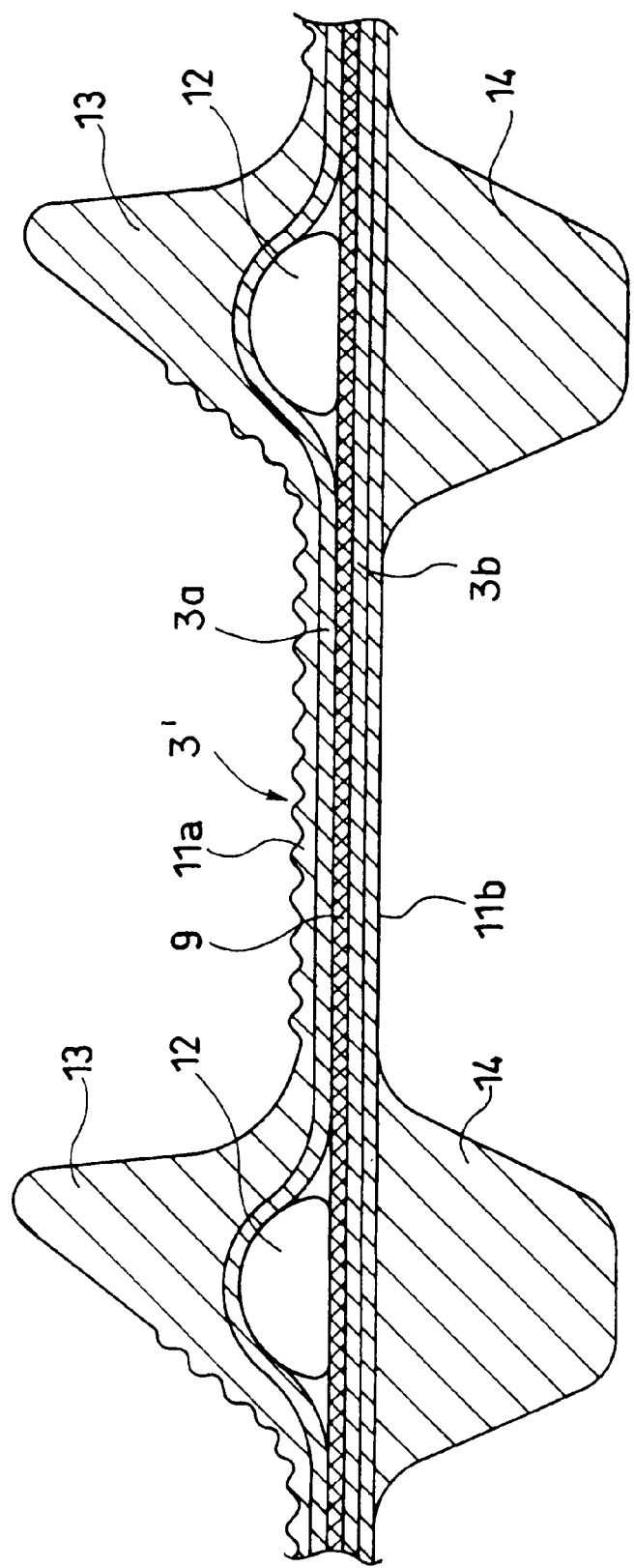
FIG. 7 is a partially expanded sectional view showing a conventional track belt main body, the cross section being taken along a line A—A shown in FIG. 11.

According to the present invention, the horizontal rigid member (rod) 12 is disposed between the core body 9 and the inner reinforcing layer 10*b*, in a cross direction of the track belt main body 3. In the conventional case, however, as shown in FIG. 7, a horizontal rigid member 12 is disposed between the core body 9 and the outer reinforcing woven cloth 10*a*.

The disposition of the horizontal rigid member 12 between the core body 9 and the inner reinforcing layer 10*b* enables a function of holding the horizontal rigid member to be provided to both of the outer reinforcing layer 10*a* and the core body 9. As a result, a horizontal rigid member holding force can be increased without causing any increases in weight and rolling resistance. Thus, it is possible to improve snowmobile high-speed running performance.

Figure 8:
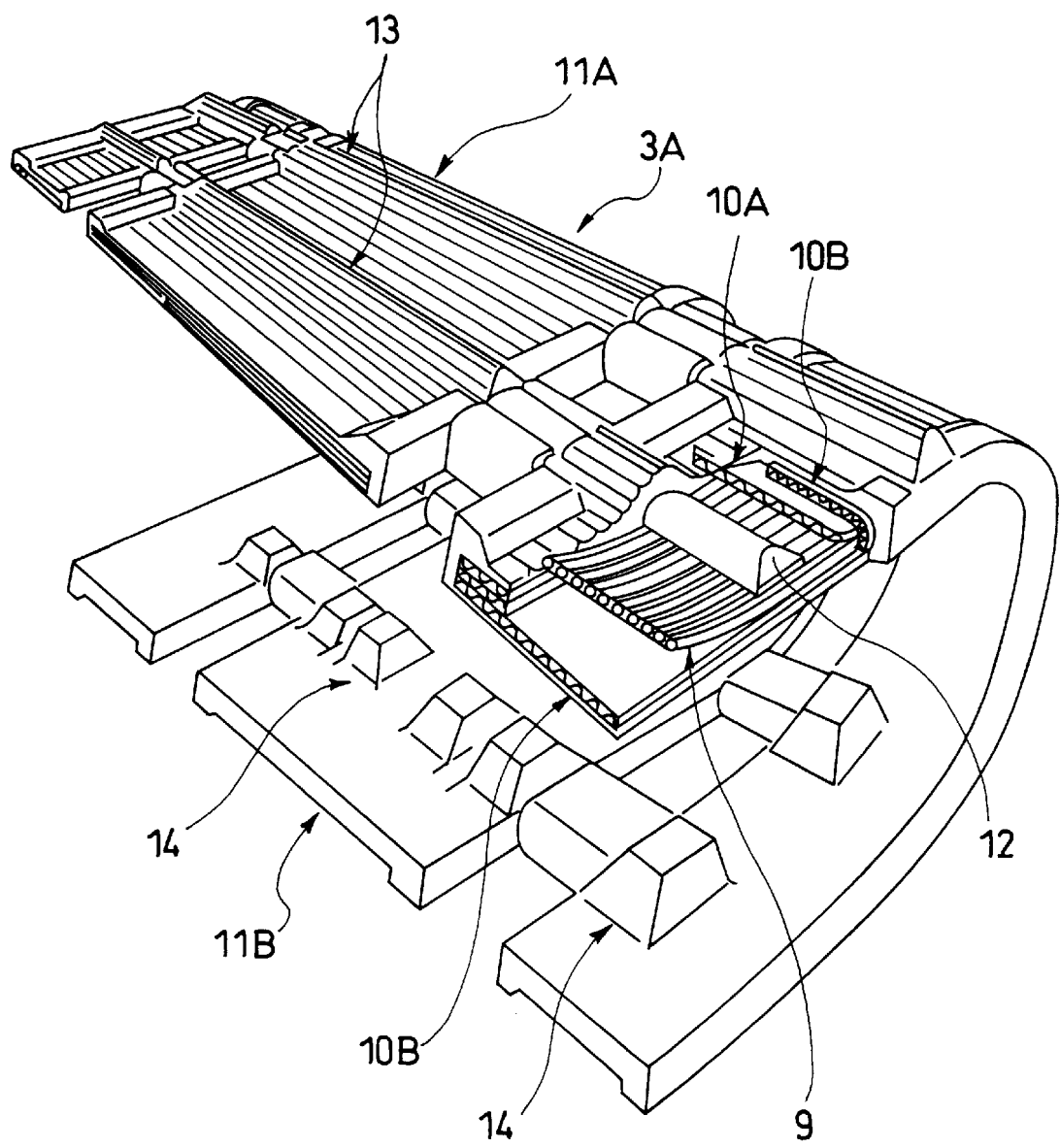
FIG. 8 is another partially cutaway perspective view showing the track belt main body of the embodiment of the present invention.

FIG. 8 is a partially cutaway perspective view showing a track belt main body 3A of another example of the embodiment of the present invention. In FIG. 8, the core body 9 is made of a polyester cord and arranged along a longitudinal direction of the track belt main body 3A. The are reinforcing woven cloths 10A and 10B respectively disposed in the outside and inside of the core body 9, and the are cover layers 11A, 11B are made of elastic rubber materials and are respectively disposed in the outside and inside of the reinforcing woven cloths 10A and 10B. The horizontal rigid member (rod) 12 is buried between the outer core body 9 and the reinforcing woven cloth 10A.

Traction projection 13 is provided on the surface of the outer cover layer 11A. The driving projection is provided on the surface of the inner cover layer 11B so as to be engaged with a pin of a wheel sprocket.

In FIG. 8, the inner reinforcing woven cloth 10B is folded and stacked on the outer reinforcing woven cloth 10A so as to be integral in the track direction of the track belt main body 3A on the circumference of the same. Further, such a folding of the reinforcing woven cloth 10B is made only in the vicinity of the side of the horizontal rigid member 12.

In other words, external layer fracture or breaking of the horizontal rigid member 12 occurs only in the vicinity of the side end part of the horizontal rigid member 12, where a horizontal rigid member holding force is weak. Thus, by folding the inner reinforcing woven cloth 10B, at least a part in the vicinity of the side of the horizontal rigid member 12 is reinforced.

As a result, even if a weight is reduced by decreasing the strength of the outer reinforcing woven cloth 10A of the core body 9, a holding force in the vicinity of the side end part of the horizontal rigid member 12 can be set high.

As described above, the inner reinforcing woven cloth 10B of the core body 9 is folded and stacked on the outer reinforcing woven cloth 10A of the core body 9 so as to form an integrated structure. This enables a function of the horizontal rigid member 12 to be provided to both reinforcing woven cloths 10A and 10B disposed in the outside and inside of the core body 9. Accordingly, a holding force of the horizontal rigid member 12 can be increased without causing any substantial weight increases. Thus, it is possible to improve snowmobile high-speed running performance.

Figure 9:
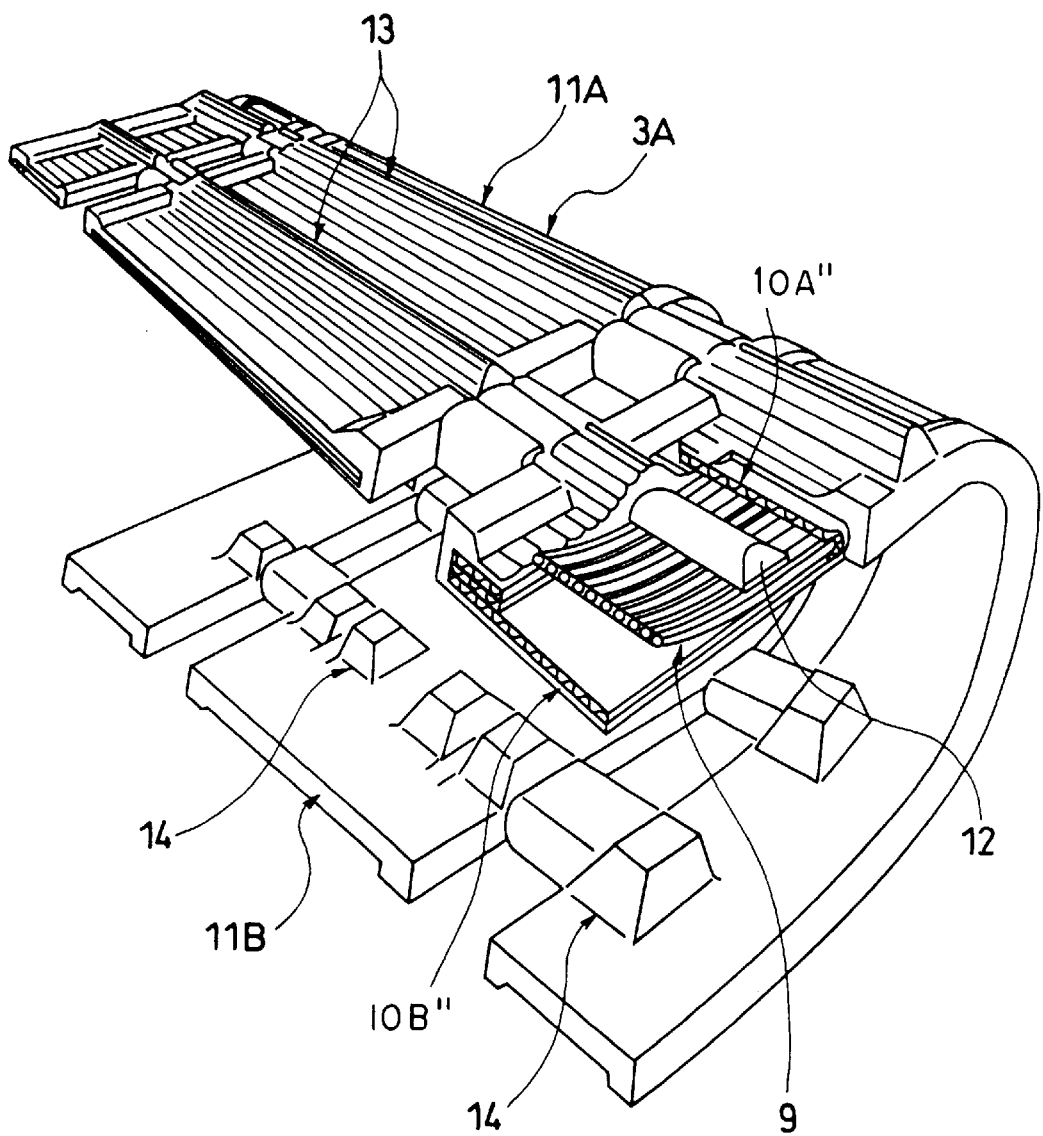
FIG. 9 is still another cutaway perspective view showing the track belt main body of the embodiment of the present invention.

FIG. 9 is a partially cutaway perspective view showing a track belt main body 3a of still another example of the embodiment of the present invention. In FIG. 9, without using an outer reinforcing woven cloth of a core body 9, the inner reinforcing woven cloth 10B" is folded on the core body 9. Accordingly, the inner reinforcing woven cloth 10B" can be used also as an outer reinforcing woven cloth, and folding of the reinforcing woven cloth 10B is made only in the vicinity of the side of a horizontal rigid member 12 as in the case shown in FIG. 8.

The foregoing folding of the inner reinforcing woven cloth 10B" of the core body 9 around the same enables a function of holding the horizontal rigid member 12 to be provided to both layer of reinforcing woven cloths cloth 10B" disposed in the outside and inside of the core body 9. Accordingly, a holding force of the horizontal rigid member 12 can be increased without causing any substantial increase in the weight. Thus, it is possible to improve snowmobile high-speed running performance.

Although the preferred embodiment of the present invention has been described in detail, it should be understand that various changes, substitutions and alternations can be made therein without departing from spirit and scope of the inventions as defined by the appended claims.

What is claimed is:

1. A track belt for a snowmobile comprising:

a track belt main body;

a core body arranged along a longitudinal direction of said track belt main body and having an inner surface and an outer surface relative to use of the track belt;

reinforcing woven cloths disposed respectively on the outside and inside surfaces of said core body;

cover layers covering said reinforcing woven cloths; and a plurality of horizontal rigid members placed at specified intervals along the longitudinal direction of said track belt main body and buried in a cross direction of the track belt main body, wherein overlapping end joined parts of said reinforcing woven cloths are disposed respectively on one of outside and inside sides of said horizontal rigid member relative to a direction perpendicular to the longitudinal direction of the track belt main body.

2. A track belt for a snowmobile according to claim 1, wherein the overlap at the ends of said reinforcing woven cloths is disposed respectively in opposing positions on a circumference of said track belt main body.

* * * * *